United States Patent
Erickson

(10) Patent No.: US 7,267,314 B1
(45) Date of Patent: Sep. 11, 2007

(54) MONITOR CEILING MOUNT

(76) Inventor: Roger C. Erickson, 4334 Leo Ct., Eagan, MN (US) 55123

( * ) Notice: Subject to any disclaimer, the term of this patent is extended or adjusted under 35 U.S.C. 154(b) by 382 days.

(21) Appl. No.: 11/112,488

(22) Filed: Apr. 22, 2005

(51) Int. Cl.
A47H 1/10 (2006.01)

(52) U.S. Cl. .................... 248/333; 248/323; 248/161; 248/157; 248/343; 108/144.11; 403/13

(58) Field of Classification Search ............... None
See application file for complete search history.

(56) References Cited

U.S. PATENT DOCUMENTS

| 495,409 | A | * | 4/1893 | Fry ........................... 211/115 |
| 4,587,864 | A | * | 5/1986 | Kassai ....................... 74/551.3 |
| 4,652,890 | A | * | 3/1987 | Crean ......................... 343/882 |
| 4,926,786 | A | * | 5/1990 | White ........................ 116/324 |
| 4,964,606 | A | * | 10/1990 | Beam et al. ................ 248/333 |
| 5,340,076 | A | * | 8/1994 | Dockwiller, III ............ 248/371 |
| 5,405,117 | A | * | 4/1995 | Davis ......................... 248/333 |
| 5,513,825 | A | * | 5/1996 | Gutgsell .................... 248/188.5 |
| 5,568,954 | A | * | 10/1996 | Burgess ...................... 292/338 |
| 5,794,908 | A | * | 8/1998 | East et al. ................ 248/503.1 |
| 6,488,439 | B1 | * | 12/2002 | Lackey, Sr. ................ 403/305 |
| 2005/0139742 | A1 | * | 6/2005 | Frisell ........................ 248/317 |
| 2006/0016945 | A1 | * | 1/2006 | Taylor ..................... 248/188.5 |
| 2006/0138288 | A1 | * | 6/2006 | Parsons .................. 248/125.7 |

* cited by examiner

Primary Examiner—Kimberly T. Wood
(74) Attorney, Agent, or Firm—Nikolai & Mersereau, P.A.; Steven E. Kahm

(57) ABSTRACT

An easy to install easy to adjust mounting for holding a monitor from the ceiling is disclosed. The mounting swivels to face any direction in the room, tilts to point the monitor at any angle and has an adjustable length to fit any height ceiling or desired position of the monitor. The wires or cables are easily hidden inside of the mounting, which has two slit tubes. The slits are aligned to easily insert the wires through the sides of the tubes. The height adjustment is inside of the tubes to improve the appearance of the mounting. The height adjustment is by telescoping tubes one having a pair of setscrews for engaging a channel inside of the other tube. The setscrews thereby prevent rotational changes in the tubes keeping the slots in the tubes aligned while allowing height adjustment.

7 Claims, 5 Drawing Sheets ically along most of the length of the

MONITOR CEILING MOUNT

BACKGROUND OF THE INVENTION

1. Field of the Invention

This invention relates to adjustable supports for equipment such as monitors hanging from a ceiling.

2. Description of the Related Art

There are supports for monitors which hang from the ceiling, however the supports in use today are not as easily adjustable and do not have the ease of access to the internal portion of the support to hide wires and cables to present a cleaner look. Further the adjustments to the length of the support are visible in most current designs.

SUMMARY OF THE INVENTION

A plate is attached to a sheet of plywood or other solid object for holding the weight of the monitor and the support. The plate has a threaded portion for screwing in a threaded outer tube. The outer tube has a slit most of the length of the tube to allow wires and cables access to the inside of the tube and to allow access to the length adjustment of the support. The outer tube has a channel aligned with the slit for contact with setscrews on the inside of an inner tube which slides up and down within the outer tube. The inner tube has a slit along its entire length and has threaded apertures for setscrews opposite the slit for access to the setscrews. The setscrews a turned to tighten the screws into the channel on the inside surface of the outer tube thus locking the tubes in position relative to each other for adjusting the length of the combined tubes and preventing relative angular movement between the tubes. The slit in the inner tube also allows wires and cables to run the length of the support. At the bottom of the inner tube are pivotally attached arms, which connect to a plate for supporting the monitor. The pivot allows angular adjustments of the monitor from facing flat downward to facing horizontally or even to be tilted upward if desired. An adjustment lever quickly and easily secures the angle of the arms and the monitor plate in the desired position. The rotary angle for positioning the monitor is controlled by turning the inner and outer tubes when they are locked together by the setscrews. The threads at the top of the outer tube allow turning of the support relative the top plate to adjust the angle the monitor faces relative to the walls of the room. A setscrew above the plate at the top of the threads in the outer tube prevents the outer tube from being unscrewed from the plate, which would allow the support to come down while the angle is being adjusted.

Cables and wires are hidden inside of the tubes by passing through the slits in the tubes. A wider slit is provided near the top of the outer tube to allow for cable connections to fit through the slit. The slit provides easier access than having to put the wires or cables in the tubes before the tubes are installed and allows access for unplugging wires and cables without having to remove the tubes where a monitor is being installed or changed.

OBJECTS OF THE INVENTION

It is an object of the invention to provide a monitor support from the ceiling which is angularly adjustable on the pitch and yaw axes relative to the ceiling.

It is an object of the invention to hide the wires and cables inside of the monitor support for a cleaner look.

It is an object of the invention to provide easy access to wires cables and connections in the monitor support.

It is an object of the invention to provide an easy to install ceiling support for a monitor.

It is an object of the invention to provide an easy to adjust length ceiling support with the length adjustment hidden from view.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
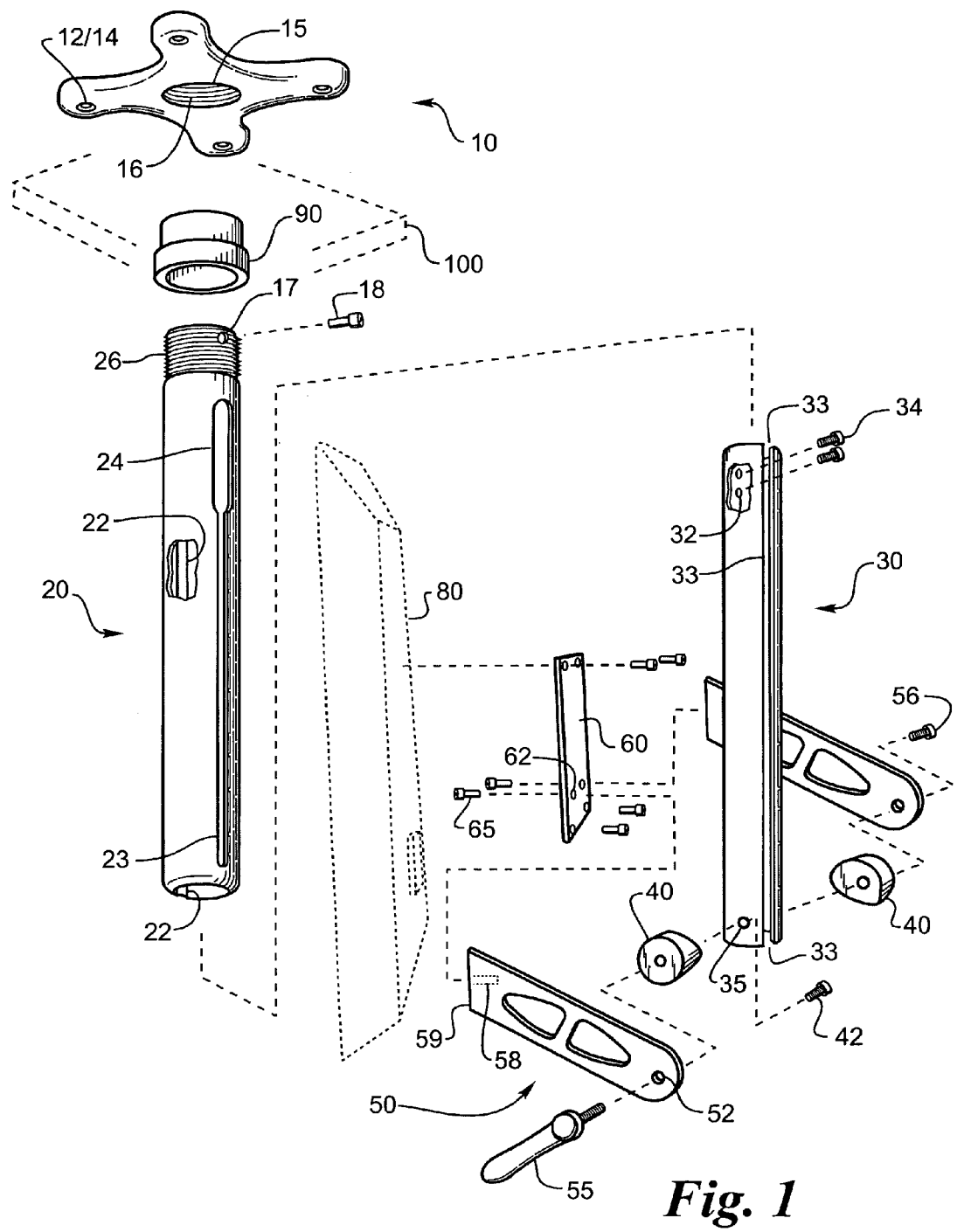
FIG. 1 is an expanded perspective view of the parts in the ceiling support.
Figure 2:
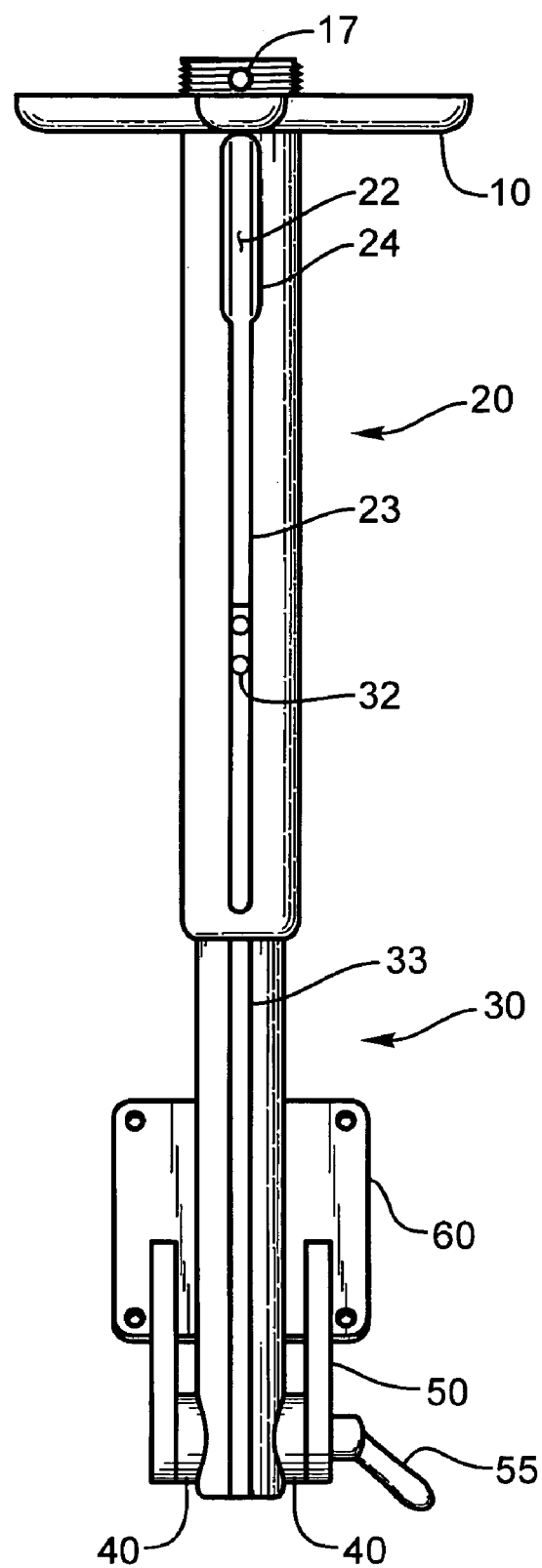
FIG. 2 is an assembled rear view of the parts in the ceiling support.
Figure 3:
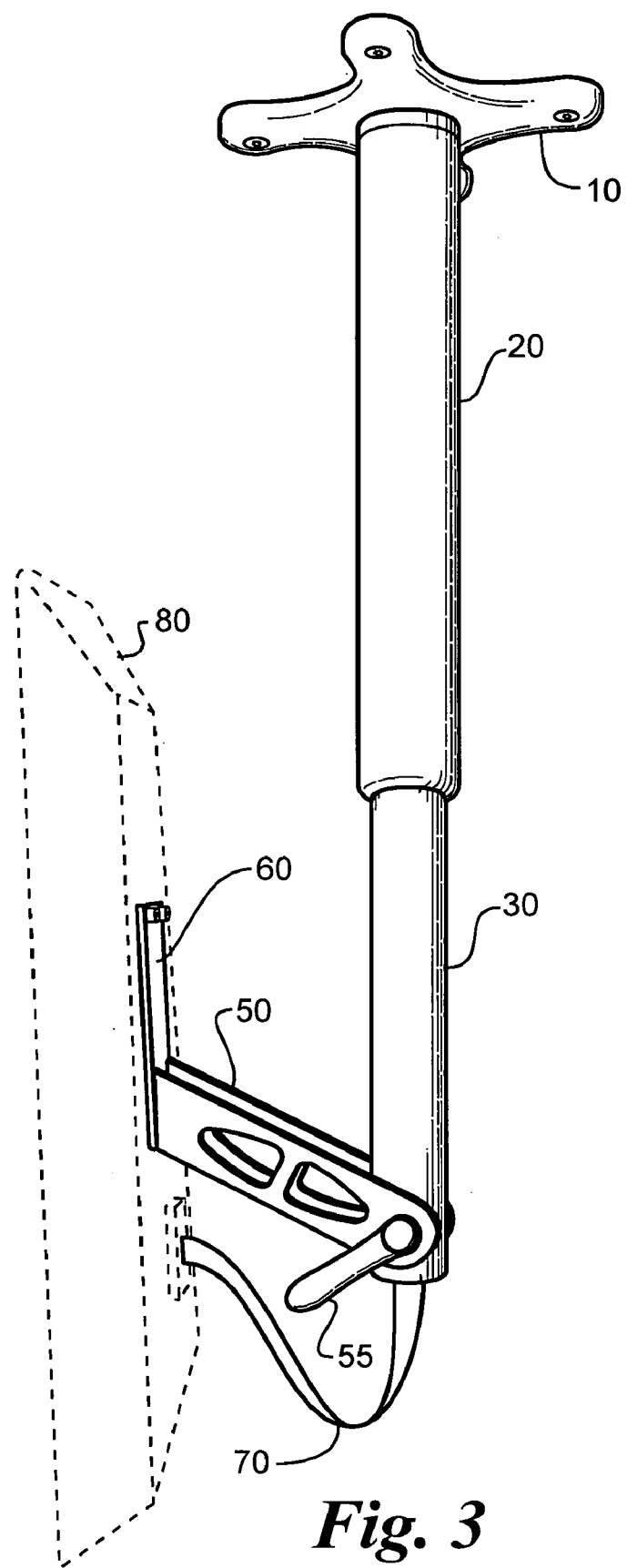
FIG. 3 is a right side perspective view of the ceiling support holding a monitor.
Figure 4:
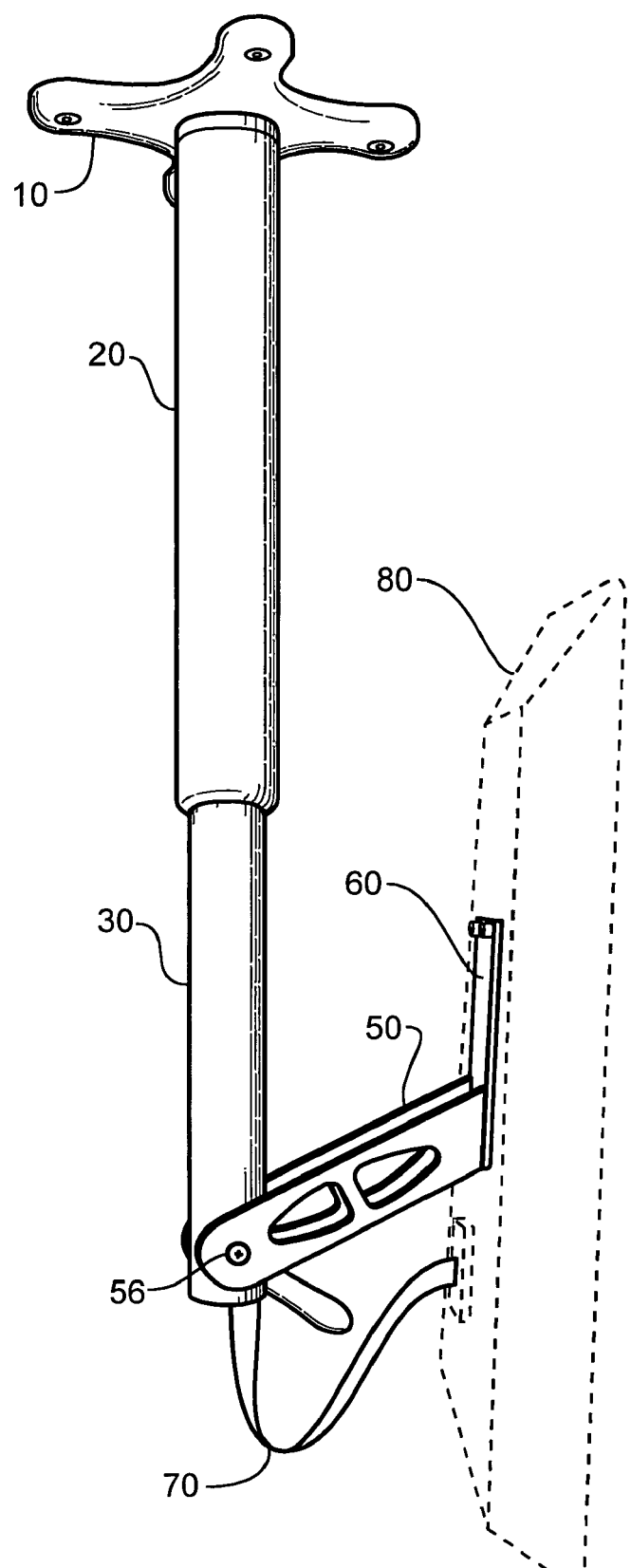
FIG. 4 is a left side perspective view of the ceiling support holding a monitor.
Figure 5:
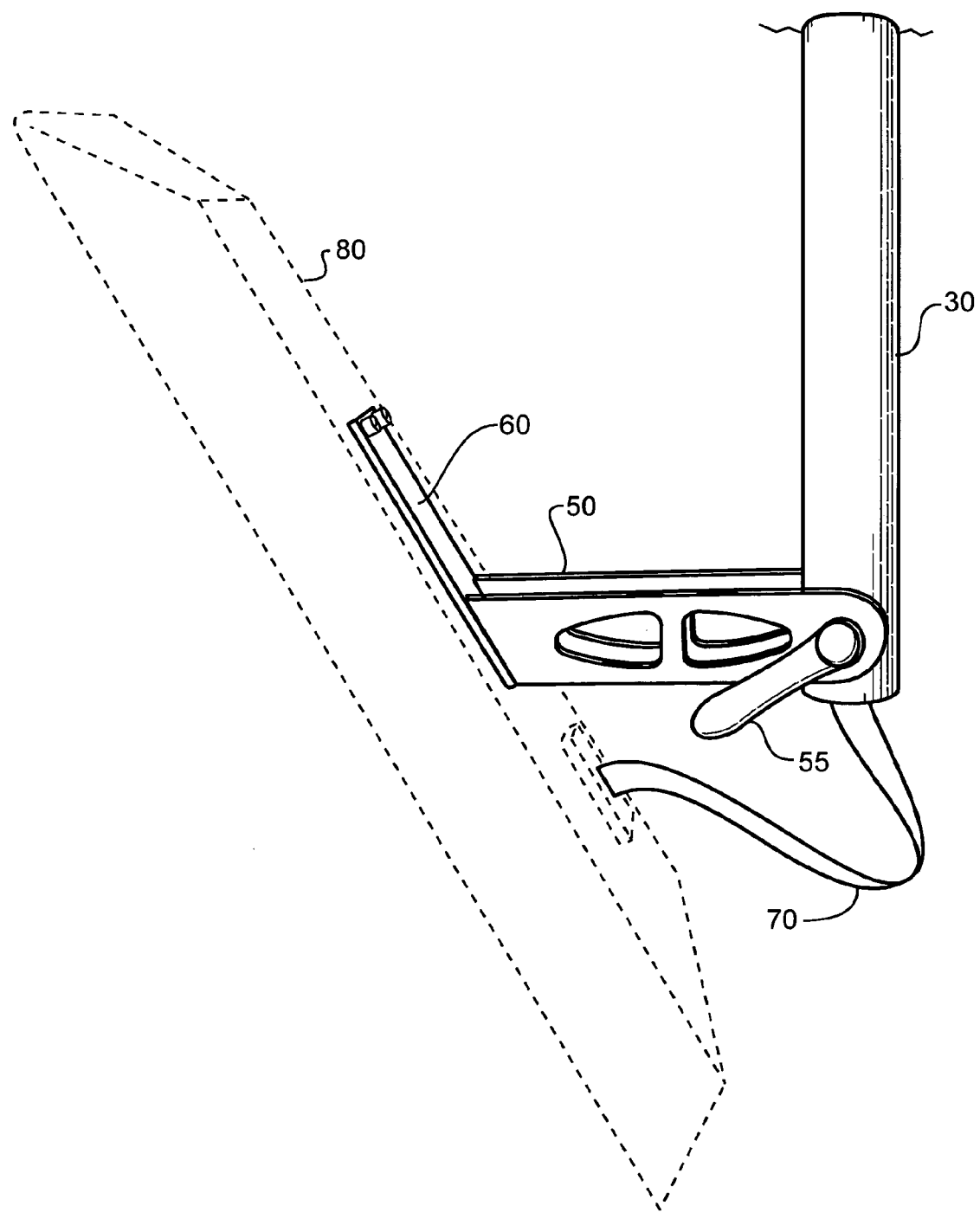
FIG. 5 is a right rear perspective view of the ceiling support holding a monitor.

In many instances it is desired to have a monitor such as a cathode ray tube, liquid crystal display, or a plasma display provide pictures and optionally sound to patients and doctors in doctors' offices, dental offices, hospitals, businesses or homes for displaying images. For example in a dentists' office a picture of the teeth and gums may be used to show the patient and the doctor the condition of the patient.

The support for the monitor comes in a package containing a top plate 10, which is to be attached to the ceiling. In many office and commercial buildings the ceiling has a matrix of ceiling panel supports. The ceiling panels are generally not strong enough to support a monitor. The top plate 10 is designed with apertures 12 which have a chamfer 14 to permit screws to pass therethrough and set in flush with the surface of the plate 10, and secure the top plate to a piece of plywood 100 or other support behind the ceiling panel. Typically a piece of plywood 100 would be fitted into the matrix in the ceiling with the ceiling panel attached below the plywood. There are two possible embodiments for the ceiling panel. In one embodiment the top plate 10 is on the bottom of the ceiling panel with the screws going though the ceiling panel into the plywood. In the other embodiment the top plate 10 is on top of the plywood and a hole through the ceiling panel and the plywood allows outer tube 20 access to the top plate 10. In this embodiment a collar 90 may be used to ornamentally engage the hole in the ceiling panel and the outer tube 20. The collar 90 is press fit or glued into the ceiling panel.

With the top plate 10 in place the outer tube 20 having threads 26 at the top end is screwed into the threads 16 in aperture 15 on top plate 10. The threads 26 are a longer length than the thickness of top plate 10 so that the setscrew aperture 17 extends past the top of the top plate 10. With the setscrew aperture 17 above the top plate 10 a setscrew 18 is placed in setscrew aperture 17 to prevent the outer tube 20 from being unscrewed from the top plate. The outer tube 20 has a slit 23 running axially along most of the length of the outer tube 20 to allow easy access for wires and cables to the inside of the outer tube 20. Slit 23 preferably has a wider slit portion 24 near the top of the outer tube 20 to allow plugs on the wires and cables to fit through the side.

The outer tube 20 has a channel 22 running most of the length of the outer tube in the inside surface opposite the slit 23, 24. Channel 22 is for receiving setscrews 34, which pass through threaded apertures 32 of inner tube 30. Inner tube 30 has an outer diameter, which is just smaller than inner diameter of outer tube 20 so that the inner tube 30 telescopes inside of the outer tube 20. The inner tube 30 has a slit for its entire length opposite the threaded setscrew apertures 32. With slits 23, 24 in outer tube 20 and slit 33 in inner tube 30 aligned setscrews 34 can be tightened into channel 22 to prevent the turning of outer tube 20 relative inner tube 30 and to lock the length of the telescoping outer and inner tubes 20 and 30 in place. With the slots 23, 24 and 33 aligned a tool may pass though the side of the outer and inner tubes 20 and 30 to tighten or loosen setscrews 34.

At the base of inner tube 30 are apertures 35 for attaching pivot spacers 40 to the outside of inner tube 30 by use of screw plugs 42 through apertures 35 and pivot spacers 40. Arms 50 having apertures 52 are secured by either a screw 56 or an adjustment lever 55 which engage the screw plugs 42 and secure arms 50 in place angularly with respect to inner tube 30.

Arms 50 have threaded apertures 58 at the base which, are used in conjunction with screws 65 and apertures 62 to secure monitor mounting plate 60 to arms 50. The monitor mounting plate 60 is attached to a monitor 80.

The arms 50 have a base 59 and aperture 58 which are angled with respect to the axis of length of the arm to tilt the attached monitor mounting plate 60 with respect to the arms.

The monitor 80 can be rotated relative to the walls of the room by turning the outer tube 20 within the range of threading available between threads 16 in plate 10 and the threads 26 on outer tube 26. The limits of rotational movement are the setscrew 18 and the end of the threading 26 at the top of the outer tube. Preferably there is enough threading for the monitor to be turned in any desired direction.

The height of the monitor 80 can be adjusted by telescoping the inner tube 30 within the outer tube 20 by relative movement thereof and then locking the inner tube and outer tube in place relative to each other by setscrews 34.

The tilt of the monitor 80 can be adjusted by use of either the adjustment lever 55, screw 56 or both to pivot arms 50 relative to inner tube 30.

Wires or cables and their respective connections can be placed inside of the outer and inner tubes 20 and 30 when their slots 23, 24 and 33 respectively are aligned.

The tilt of the monitor 80 may be adjusted by use of two adjustment levers 55 instead of one adjustment lever and one screw 56.

The slit 23, 24 in outer tube 20 may be continuous along the length of the outer tube 20 instead of ending in the threads 26.

The plate may be attached to the ceiling in any way including being attached to the metal matrix materials holding up ceiling tiles. The means for attachment may be glue, nails, screws, bolts or other fastening means which will support the expected loads safely.

In alternative embodiments the threads for connecting the plate 10 and outer tube 20 may be replaced with another attachment means or they may be integral to each other.

Obviously, many modifications and variations of the present invention are possible in light of the above teachings. It is therefore to be understood that, within the scope of the appended claims, the invention may be practiced otherwise than as specifically described.

What is claimed is:

1. A ceiling mounting comprising:
    a plate having a threaded portion for attachment to a ceiling,
    an outer tube having threads on the outer diameter for threading into the threads on the plate,
    an axial slit along a portion of the outer tube,
    a channel on the inner diameter of the outer tube opposite the slit,
    an inner tube for telescopically fitting into the outer tube, the inner tube having an axial slit along its length, and at least one setscrew aperture opposite the axial slit,
    a setscrew for inserting in each setscrew aperture in the inner tube for passing through the inner tube and engaging the channel on the inner diameter of the outer tube to secure the outer tube and the inner tube in one position relative to each other,
    a pair of arms pivotable attached at one end of the inner tube and connected to,
    a mounting plate to which a monitor may be attached.

2. A ceiling mounting as in claim 1 wherein,
    the slit in the outer tube is larger on a portion near the top of the outer tube to allow plugs and connections through the side of the outer tube in addition to just wiring and cables.

3. A ceiling mounting as in claim 1 wherein,
    a collar surrounds the outer tube to conceal apertures in ceiling tiles.

4. A ceiling mounting as in claim 1 wherein,
    the arms have an angled base to tilt the mounting plate relative the arms.

5. A ceiling mounting as in claim 1 wherein,
    pivot spacers are attached to the inner tube between the arms and the inner tube.

6. A ceiling mounting as in claim 1 wherein,
    a setscrew aperture in the outer tube threads limits the turning of the outer tube relative to the plate when a setscrew is inserted to keep the outer tube from being unscrewed from the plate by engaging the upper part of the plate.

7. A ceiling mounting as in claim 1 wherein,
    an adjustment lever loosens and tightens the arms to the inner tube for ease of pivoting the arms and locking them in place relative the inner tube.

* * * * *